(12) United States Patent
Sumida

(10) Patent No.: US 9,340,253 B2
(45) Date of Patent: May 17, 2016

(54) SUSPENSION APPARATUS

(71) Applicant: KAYABA INDUSTRY CO., LTD., Tokyo (JP)

(72) Inventor: Masashi Sumida, Gifu (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 14/401,852

(22) PCT Filed: May 20, 2013

(86) PCT No.: PCT/JP2013/063965
§ 371 (c)(1),
(2) Date: Nov. 18, 2014

(87) PCT Pub. No.: WO2013/176091
PCT Pub. Date: Nov. 28, 2013

(65) Prior Publication Data
US 2015/0108700 A1 Apr. 23, 2015

(30) Foreign Application Priority Data
May 22, 2012 (JP) ................. 2012-116376

(51) Int. Cl.
*F16F 9/44* (2006.01)
*B62K 25/28* (2006.01)
*F16F 9/56* (2006.01)
(Continued)

(52) U.S. Cl.
CPC ............. *B62K 25/283* (2013.01); *B62K 25/06* (2013.01); *B62K 25/10* (2013.01); *B62K 25/28* (2013.01); *F16F 9/461* (2013.01); *F16F 9/466* (2013.01); *F16F 9/56* (2013.01); *B62K 2025/044* (2013.01); *B62K 2025/045* (2013.01); *B62K 2025/048* (2013.01)

(58) Field of Classification Search
CPC ..... B62K 25/04; B62K 2025/048; F16F 9/44; F16F 9/461; B60G 13/003
USPC ............ 188/319.1, 319.2; 280/124.108
See application file for complete search history.

(56) References Cited

U.S. PATENT DOCUMENTS 2,162,292 A 6/1939 Armstrong
5,522,483 A 6/1996 Koch
(Continued)

FOREIGN PATENT DOCUMENTS

DE 4311626 A1 10/1994
JP 1965-019807 B1 9/1965
(Continued)

*Primary Examiner* — Christopher Schwartz
(74) *Attorney, Agent, or Firm* — Rabin & Berdo, P.C.

(57) ABSTRACT

A shock absorber of a suspension apparatus includes a pair of chambers, a flow passage connects the chambers such that a working fluid passes through the flow passage as the shock absorber expands and contracts, a damping force generation mechanism applies resistance to the working fluid passing through the flow passage, a bypass passage connects the chambers so as to bypass the flow passage, a variable throttle member that is inserted into the bypass passage to be capable of advancing and retreating in order to modify an opening of the bypass passage, an actuator drives the variable throttle member and includes an acting portion disposed on a back surface side of the variable throttle member, and a power transmission mechanism interposed between the acting portion and the variable throttle member in order to transmit a linear motion of the acting portion to the variable throttle member.

10 Claims, 9 Drawing Sheets

(51) Int. Cl.
  *B62K 25/10* (2006.01)
  *F16F 9/46* (2006.01)
  *B62K 25/06* (2006.01)
  B62K 25/04 (2006.01)

(56) References Cited

U.S. PATENT DOCUMENTS

| | | | | |
|---|---|---|---|---|
| 5,697,634 | A * | 12/1997 | Kamimae | B60G 13/003 280/124.108 |
| 6,279,703 | B1 * | 8/2001 | Mete | F16F 9/44 188/319.1 |
| 6,491,146 | B1 * | 12/2002 | Yi | B62K 25/04 188/319.2 |
| 7,147,207 | B2 * | 12/2006 | Jordan | F16F 9/461 188/322.22 |
| 8,622,180 | B2 * | 1/2014 | Wootten | F16F 9/461 188/278 |

FOREIGN PATENT DOCUMENTS

| | | |
|---|---|---|
| JP | 1980-102133 U1 | 7/1980 |
| JP | 1985-024688 U1 | 2/1985 |
| JP | 1991-091546 U1 | 9/1991 |
| JP | 1993-017245 U1 | 3/1993 |
| JP | 1998-281207 A | 10/1998 |
| JP | 1999-210804 A | 8/1999 |
| JP | 2003-172394 A | 6/2003 |
| JP | 2011-117493 A | 6/2011 |

* cited by examiner

SUSPENSION APPARATUS

TECHNICAL FIELD

The present invention relates to an improvement in a suspension apparatus.

BACKGROUND ART

Typically, in a transportation device such as an automobile or a motorcycle, a suspension apparatus is interposed between a vehicle body and a vehicle wheel in order to suppress transmission of an impact generated by irregularities on a road surface or the like to the vehicle body.

JP2011-117493A, for example, discloses a front fork that suspends a front wheel of a motorcycle. The front fork includes a suspension apparatus main body constituted by an outer tube connected to a vehicle body side and an inner tube coupled to a vehicle wheel side and inserted retractably into the outer tube. A shock absorber and a suspension spring are housed in parallel inside the suspension apparatus main body.

The shock absorber includes a pair of chambers defined by a piston within a cylinder, a flow passage formed in the piston to connect the pair of chambers in the cylinder, and damping force generating means for applying resistance to a working fluid passing through the flow passage. The shock absorber includes a bypass passage that connects the pair of chambers in the cylinder so as to bypass the flow passage in which the damping force generating means is provided, a variable throttle member that is inserted into the bypass passage to be capable of advancing and retreating in order to modify an opening of the bypass passage, and an actuator that drives the variable throttle member.

SUMMARY OF INVENTION

Here, when the suspension apparatus is used as a rear cushion unit that suspends a rear wheel of a motorcycle, for example, a vehicle body side attachment member for connecting the shock absorber to the vehicle body side is preferably provided on a central axis of the shock absorber. In this case, the variable throttle member, the actuator, and the vehicle body side attachment member are arranged longitudinally along the central axis of the shock absorber.

However, in this case, the variable throttle member and the vehicle body side attachment member are removed from each other, leading to an increase in a distance between a vehicle wheel side attachment member for connecting the shock absorber to the vehicle wheel side and the vehicle body side attachment member. Hence, an attachment dimension of the suspension apparatus lengthens, and as a result, a stroke length of the suspension apparatus may be restricted.

Further, when the shock absorber is set in an inverted orientation such that the actuator is disposed on the vehicle wheel side, the variable throttle member, the actuator, and the vehicle wheel side attachment member are arranged longitudinally along the central axis of the shock absorber. Likewise in this case, therefore, the attachment dimension of the suspension apparatus lengthens, and as a result, the stroke length of the suspension apparatus may be restricted.

The present invention has been designed in consideration of the problems described above, and an object thereof is to shorten an attachment dimension of a suspension apparatus even in a case where an actuator is disposed on a vehicle body side such that a vehicle body side attachment member and a variable throttle member are disposed along a central axis of a shock absorber, or a case in which the actuator is disposed on a vehicle wheel side such that a vehicle wheel side attachment member and the variable throttle member are disposed along the central axis of the shock absorber.

According to one aspect of the present invention, a suspension apparatus interposed between a vehicle body and a vehicle wheel is provided. The suspension apparatus includes a shock absorber having a cylinder and a piston rod inserted retractably into the cylinder and a biasing member that biases the shock absorber in an expansion direction. The shock absorber includes a pair of chambers housing a working fluid, a flow passage that connects the pair of chambers such that the working fluid passes through the flow passage as the shock absorber expands and contracts, a damping force generation mechanism that is configured to apply resistance to the working fluid passing through the flow passage, a bypass passage that connects the pair of chambers so as to bypass the flow passage, a variable throttle member that is inserted into the bypass passage to be capable of advancing and retreating in order to modify an opening of the bypass passage, an actuator that is configured to drive the variable throttle member, and includes a motor, an acting portion disposed on a back surface side of the variable throttle member and provided eccentrically relative to the variable throttle member, and a motion conversion mechanism that is configured to convert a rotary motion of the motor into a linear motion of the acting portion, and a power transmission mechanism interposed between the acting portion and the variable throttle member in order to transmit the linear motion of the acting portion to the variable throttle member.

The details as well as other features and advantages of the present invention are set forth in the remainder of the specification and are shown in the accompanying drawings.

DESCRIPTION OF EMBODIMENTS

First Embodiment

A suspension apparatus 100 according to a first embodiment of the present invention will be described below with reference to the figures. Identical reference symbols used over a plurality of figures denote identical or corresponding components.

Figure 7:
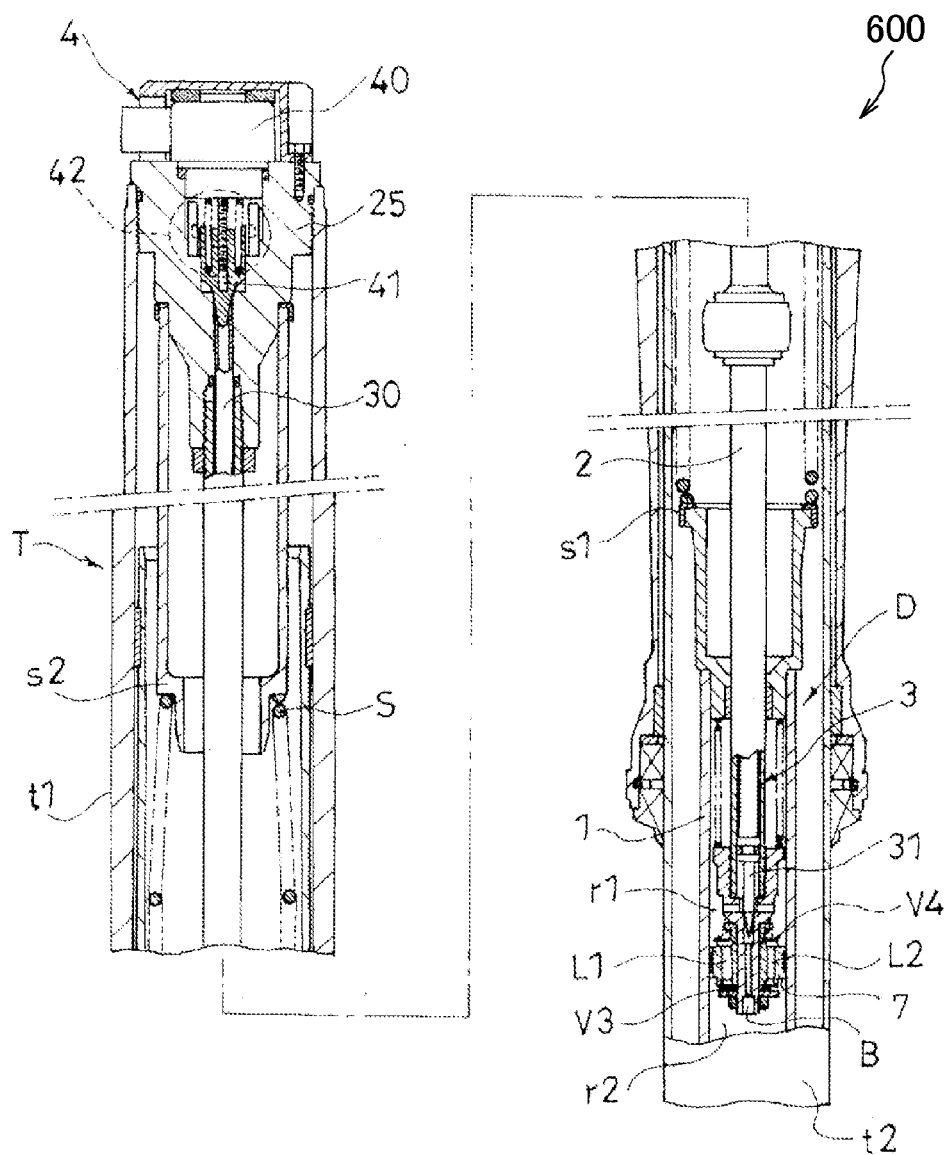
FIG. 7 is a longitudinal sectional view showing a suspension apparatus according to a comparative example of the present invention.
Figure 8:
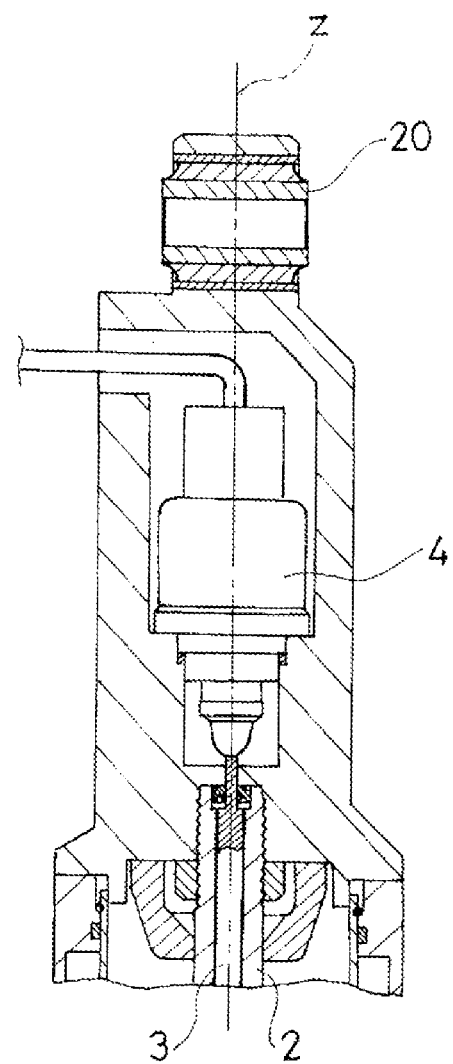
FIG. 8 is a longitudinal sectional view showing an enlargement of a vehicle body side part of the suspension apparatus according to the comparative example of the present invention in a case where a vehicle body side attachment member is provided on a central axis of a shock absorber.

First, to facilitate understanding of the suspension apparatus 100, a suspension apparatus 600 according to a comparative example of the present invention will be described with reference to FIGS. 7 and 8.

The suspension apparatus 600 is a front fork suspending a front wheel of a motorcycle. As shown in FIG. 7, the suspension apparatus 600 includes a suspension apparatus main body T constituted by an outer tube t1 connected to a vehicle body side, and an inner tube t2 connected to a vehicle wheel side and inserted retractably into the outer tube t1. A shock absorber D and a suspension spring (a biasing member) S are housed in parallel inside the suspension apparatus main body T.

The shock absorber D includes a cylinder 1 connected to the vehicle wheel side, a piston rod 2 connected to the vehicle body side and inserted retractably into the cylinder 1, and a piston 7 held by the piston rod 2 so as to slide against an inner peripheral surface of the cylinder 1. The suspension spring S is interposed between a vehicle body side spring bearing s2 fixed to the piston rod 2 side and a vehicle wheel side spring bearing s1 fixed to the cylinder 1 side. The suspension spring S biases the shock absorber D in an expansion direction at all times.

The shock absorber D includes a pair of chambers r1, r2 formed so as to be defined by the piston 7 within the cylinder 1 and filled with a working fluid, flow passages L1, L2 formed in the piston 7 to connect the pair of chambers r1, r2, and damping force generation mechanisms V3, V4 that apply resistance to working fluid passing through the flow passages L1, L2.

When the piston rod 2 advances and retracts within the cylinder 1 such that the suspension apparatus 600 expands and contracts, the working fluid in one chamber r1 (r2) that is pressurized by the piston 7 moves into the other chamber r2 (r1) through the flow passage L1 (L2). As a result, the shock absorber D can generate a damping force resulting from the resistance applied by the damping force generation mechanisms V3, V4.

The shock absorber D includes a bypass passage B that connects the pair of chambers r1, r2 so as to bypass the flow passages L1, L2, a variable throttle member 3 that is inserted into the bypass passage B to be capable of advancing and retreating in order to modify an opening of the bypass passage B, and an actuator 4 that drives the variable throttle member 3.

The variable throttle member 3 includes a needle valve 31 inserted into the bypass passage B to be capable of advancing and retreating, and a push rod 30 interposed between the needle valve 31 and the actuator 4. The actuator 4 is attached to a cap member 25 that holds the piston rod 2. The actuator 4 includes a motor 40, an acting portion 41 that contacts a back surface of the push rod 30, and a motion conversion mechanism 42 that converts a rotary motion of the motor 40 into a linear motion of the acting portion 41.

In the suspension apparatus 600 configured as described above, a flow rate of the working fluid passing through the flow passages L1, L2 in which the damping force generation mechanisms V3, V4 are provided can be modified by driving the variable throttle member 3 using the actuator 4 to modify the opening of the bypass passage B. According to the suspension apparatus 600, therefore, the damping force generated by the shock absorber D can be adjusted.

In the suspension apparatus 600, the motor 40 is disposed on a spring of the suspension spring S. Hence, in the suspension apparatus 600, an impact input from the vehicle wheel side can be absorbed by the suspension spring S, with the result that direct input of the impact into the motor 40 can be suppressed.

Here, when the suspension apparatus 600 is applied to a rear cushion unit that suspends a rear wheel of a motorcycle, for example, a vehicle body side attachment member for connecting the shock absorber D to the vehicle body side is preferably provided on a central axis of the shock absorber D. In this case, as shown in FIG. 8, the variable throttle member 3, the actuator 4, and a vehicle body side attachment member 20 are arranged longitudinally along a central axis z of the shock absorber D.

However, in this case, the variable throttle member 3 and the vehicle body side attachment member 20 are removed from each other such that a distance between a vehicle wheel side attachment member (not shown) for connecting the shock absorber D to the vehicle wheel side and the vehicle body side attachment member 20 increases. Accordingly, an attachment dimension of the suspension apparatus 600 lengthens, and as a result, a stroke length of the suspension apparatus 600 may be restricted.

Further, although not shown in the figures, when the shock absorber D is set in an inverted orientation such that the actuator 4 is disposed on the vehicle wheel side, the variable throttle member 3, the actuator 4, and the vehicle wheel side attachment member are arranged longitudinally along the central axis z of the shock absorber D. Likewise in this case, therefore, the attachment dimension of the suspension apparatus 600 lengthens, and as a result, the stroke length of the suspension apparatus 600 may be restricted.

Next, referring to FIGS. 1A to 2, a configuration of the suspension apparatus 100 will be described.

The suspension apparatus 100 is interposed between a vehicle body and a vehicle wheel. As shown in FIG. 1, the suspension apparatus 100 includes the shock absorber D having the cylinder 1 and the piston rod 2 inserted retractably into the cylinder 1, and the suspension spring S serving as a biasing member that biases the shock absorber D in the expansion direction at all times.

The shock absorber D includes the pair of chambers r1, r2 in which the working fluid is housed, the flow passages L1, L2 that connect the pair of chambers r1, r2 so that the working fluid passes through the flow passages L1, L2 as the shock absorber D expands and contracts, the damping force generation mechanisms (an expansion side damping valve V1 and a contraction side damping valve V2) that apply resistance to the working fluid passing through the flow passages L1, L2, the bypass passage B that connects the pair of chambers r1, r2 so as to bypass the flow passages L1, L2, the variable throttle member 3 that is inserted into the bypass passage B to be capable of advancing and retreating in order to modify the opening of the bypass passage B, and the actuator 4 that drives the variable throttle member 3.

The actuator 4 includes the motor 40, the acting portion 41 disposed on a back surface side of the variable throttle member 3, and the motion conversion mechanism (not shown) that converts the rotary motion of the motor 40 into the linear motion of the acting portion 41. The acting portion 41 and the variable throttle member 3 are provided eccentrically. The shock absorber D includes a power transmission mechanism 5 that is interposed between the acting portion 41 and the variable throttle member 3 in order to transmit the linear motion of the acting portion 41 to the variable throttle member 3.

The suspension apparatus 100 will now be described in further detail. The suspension apparatus 100 is a rear cushion unit that suspends a rear wheel of a motorcycle, a three-wheeled vehicle, or the like. Although not shown in the figures, the suspension apparatus 100 is interposed between the vehicle body and a swing arm that supports the rear wheel swingably. The cylinder 1 of the shock absorber D is connected to the swing arm via a vehicle wheel side attachment member 10. The piston rod 2 of the shock absorber D is connected to a frame serving as a skeleton of the vehicle body via the vehicle body side attachment member 20.

The vehicle body side attachment member 20 is attached to a housing 21 connected to a base end portion 2*a* of the piston rod 2 projecting from the cylinder 1. The vehicle body side attachment member 20 is disposed on the central axis of the shock absorber D. A tubular spring guide 22 is held vertically on the piston rod 2 side (a lower side in FIG. 1) of the housing 21. The piston rod 2 is inserted into the spring guide 22.

The vehicle body side spring bearing s2 is attached to an outer periphery of the spring guide 22 to be capable of moving in an axial direction. The vehicle wheel side spring bearing s1 is fixed to a vehicle wheel side end portion outer periphery of the cylinder 1. The suspension spring S that biases the shock absorber D in the expansion direction at all times is interposed between the vehicle wheel side spring bearing s1 and the vehicle body side spring bearing s2.

A vehicle body side end portion of the suspension spring S is supported by the movable vehicle body side spring bearing s2. A fluid constituted by a liquid or a gas is supplied to and discharged from a jack chamber J formed on an opposite side (an upper side in FIG. 1) of the vehicle body side spring bearing s2 to the suspension spring S. By moving the vehicle body side spring bearing s2 in the axial direction (an up-down direction in FIG. 1), a vehicle height and a spring reaction force of the suspension spring S can be adjusted.

The present invention is not limited to the configuration described above, and a configuration for holding the suspension spring S may be selected appropriately. For example, the vehicle wheel side spring bearing s 1 may be made movable and the vehicle body side spring bearing s2 may be fixed. Further, both the vehicle wheel side spring bearing s1 and the vehicle body side spring bearing s2 may be fixed.

The cylinder 1 is formed in a closed-end tubular shape. A vehicle body side (the upper side in FIG. 1) opening of the cylinder 1 is closed by an annular rod guide 11. Further, the shock absorber D includes a free piston 6 that is capable of moving in the axial direction so as to slide against a vehicle wheel side inner peripheral surface of the cylinder 1. A fluid chamber R and an air chamber A are defined within the cylinder 1 by the free piston 6. A working fluid constituted by oil, water, or a liquid such as an aqueous solution is charged into the fluid chamber R disposed on the rod guide 11 side (the upper side in FIG. 1) of the free piston 6. A gas is sealed into the air chamber A disposed on an opposite side (the lower side in FIG. 1) of the rod guide 11.

A tubular bearing 12 that supports the piston rod 2 to be free to move in the axial direction is fitted to an inner periphery of the rod guide 11. The piston rod 2 is supported on the rod guide 11 via the bearing 12. A tip end side of the piston rod 2 advances into and retracts from the fluid chamber R. An annular dust seal 13 is laminated to an outside air side (the upper side in FIG. 1) of the rod guide 11. An annular oil seal 14 is held on the fluid chamber R side (the lower side in FIG. 1) of the rod guide 11.

Thus, foreign matter adhered to an outer peripheral surface of the piston rod 2 can be brushed away by the dust seal 13 and thereby prevented from entering the cylinder 1. Further, working fluid adhered to the outer peripheral surface of the piston rod 2 can be brushed away by the oil seal 14, whereby the working fluid in the cylinder 1 can be prevented from flowing out to the exterior.

The annular piston 7 that slides against the inner peripheral surface of the cylinder 1 is held on an outer periphery of the tip end side of the piston rod 2. The piston 7 divides the fluid chamber R formed in the cylinder 1 into the pair of chambers r1, r2. Hereafter, a chamber formed on the piston rod 2 side (the upper side in FIG. 1) will be described as an expansion side chamber r1, and a chamber formed on the opposite side (the lower side in FIG. 1) to the piston rod 2 will be described as a contraction side chamber r2.

The pair of flow passages L1, L2 connecting the expansion side chamber r1 to the contraction side chamber r2 are formed in the piston 7. The expansion side damping valve V1 that applies resistance to the working fluid passing through the expansion side flow passage L1 by blocking an outlet of the expansion side flow passage L1 openably is laminated to the free piston 6 side (the lower side in FIG. 1) of the piston 7. Meanwhile, the contraction side damping valve V2 that applies resistance to the working fluid passing through the contraction side flow passage L2 by blocking an outlet of the contraction side flow passage L2 openably is laminated to the rod guide 11 side (the upper side in FIG. 1) of the piston 7.

The damping force generation mechanism that applies resistance to the working fluid passing through the flow passages L1, L2 that connect the pair of chambers r1, r2 is constituted by the expansion side damping valve V1 and the contraction side damping valve V2. Alternatively, the damping force generation mechanism may be formed using various other well-known configurations employing an orifice or the like.

When the piston rod 2 retreats from the cylinder 1 such that the shock absorber D configured as described above expands, the working fluid in the expansion side chamber r1, which is pressurized by the piston 7, opens the expansion side damping valve V1 so as to move into the contraction side chamber r2 through the expansion side flow passage L1. As a result, the shock absorber D can generate an expansion side damping force resulting from the resistance applied by the expansion side damping valve V1.

When, on the other hand, the piston rod 2 advances into the cylinder 1 such that the shock absorber D contracts, the working fluid in the contraction side chamber r2, which is pressurized by the piston 7, opens the contraction side damping valve V2 so as to move into the expansion side chamber r1 through the contraction side flow passage L2. As a result, the shock absorber D can generate a contraction side damping force resulting from the resistance applied by the contraction side damping valve V2.

During expansion and contraction of the shock absorber D, an interior volume of the cylinder 1 increases and decreases in accordance with a volume by which the piston rod 2 advances into and retracts from the cylinder 1. At this time, the free piston 6 moves in the axial direction (the up-down direction in FIG. 1) so as to enlarge or reduce a volume of the air chamber A, whereby it becomes possible to compensate for variation in the interior volume of the cylinder 1 during expansion and contraction of the shock absorber D.

The piston rod 2 includes a central hole b1 formed in an axial center portion so as to open onto the vehicle body side (the upper side in FIG. 1), a lateral hole b2 that connects the central hole b1 to the expansion side chamber r1, and a longitudinal hole b3 that connects the central hole b1 to the contraction side chamber r2. The bypass passage B that connects the pair of chambers r1, r2 so as to bypass the flow passages L1, L2 is constituted by the central hole b1, the lateral hole b2, and the longitudinal hole b3.

Figure 1A:
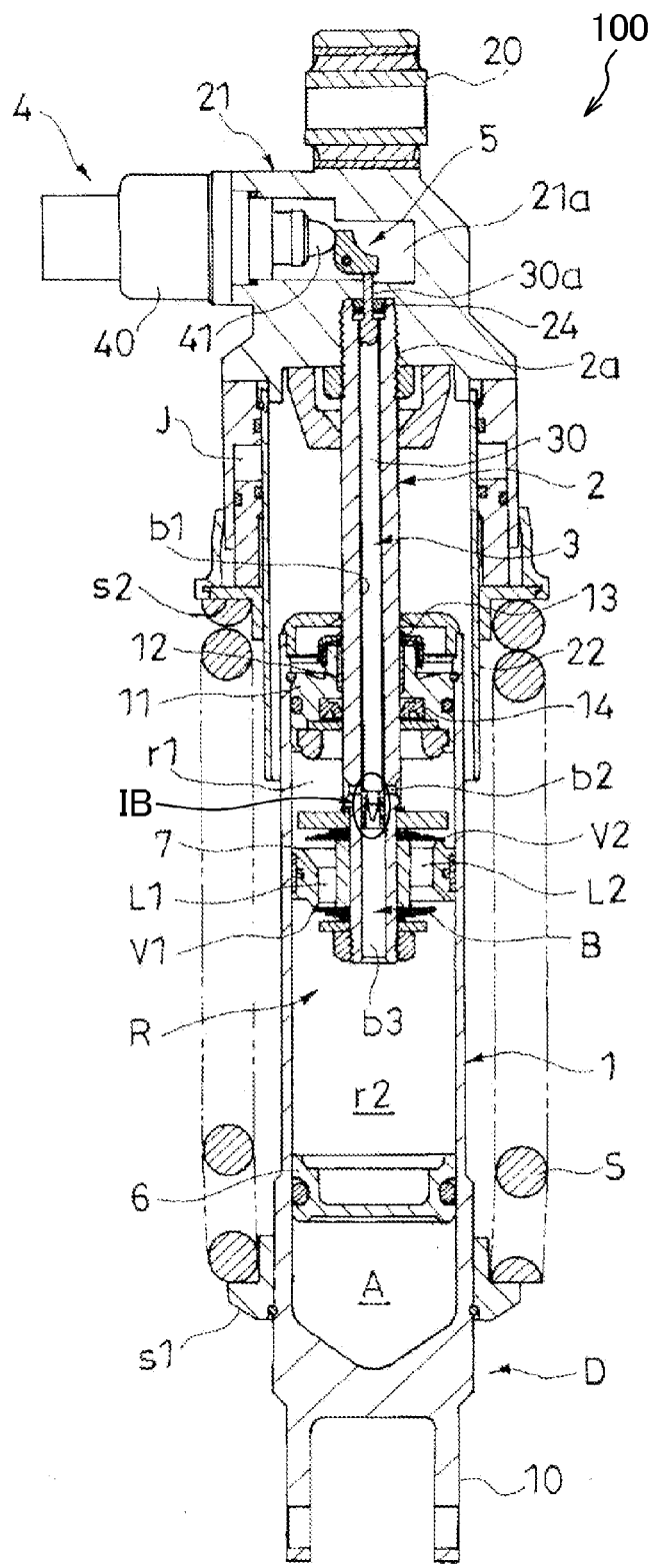
FIG. 1A is a longitudinal sectional view showing a suspension apparatus according to a first embodiment of the present invention.
Figure 1B:
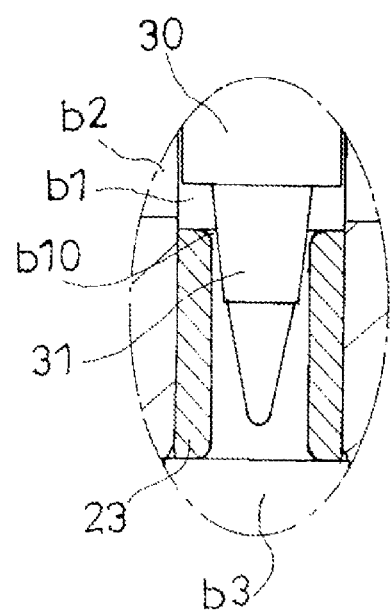
FIG. 1B is an enlarged view of an IB portion of FIG. 1A.

As shown in FIG. 1B, an annular bush 23 disposed between a longitudinal hole side opening (reference symbol omitted) and a lateral hole side opening (reference symbol omitted) of the central hole b1 is held on an inner periphery of the piston rod 2. Further, the variable throttle member 3 constituted by the push rod 30 and the needle valve 31 held on the tip end of the push rod 30 is inserted into the central hole b1 to be capable of moving in the axial direction. Hence, the variable throttle member 3 is disposed on the central axis of the shock absorber D such that a central axis x1 (see FIG. 2) of the variable throttle member 3 overlaps the central axis of the shock absorber D.

The needle valve 31 of the variable throttle member 3 is inserted retractably into the bush 23. Accordingly, an annular gap flow passage b10 formed between the needle valve 31 and the bush 23 is widened and narrowed. As a result, the opening of the bypass passage B can be modified.

As shown in FIG. 1A, in the push rod 30, a base end portion 30a positioned on an opposite side (a back surface side) to the needle valve 31 is formed to have a smaller diameter than a remaining part. An annular oil seal 24 held on the inner periphery of the piston rod 2 slides against an outer peripheral surface of the base end portion 30a of the push rod 30. As a result, the vehicle body side opening of the central hole b1 constituting the bypass passage B is blocked. A tip end of the base end portion 30a of the push rod 30 projects into a hollow portion 21a formed in the interior of the housing 21.

The actuator 4 that drives the variable throttle member 3 is held in the housing 21. The power transmission mechanism 5 that transmits an action from the actuator 4 to the variable throttle member 3 is housed in the hollow portion 21a of the housing 21.

The actuator 4 includes the motor 40, the acting portion 41 that acts on the power transmission mechanism 5, and the motion conversion mechanism (not shown) that converts the rotary motion of the motor 40 into the linear motion of the acting portion 41. Various well-known configurations, such as similar configurations to those of the actuator 4 of the comparative example described above, for example, may be employed as the configurations of the motor 40 and the motion conversion mechanism (not shown) of the actuator 4. Hence, detailed description thereof has been omitted here.

The acting portion 41 of the actuator 4 projects into the hollow portion 21a of the housing 21. As shown in FIG. 2, the actuator 4 is attached such that a central axis x2 of the acting portion 41 intersects the central axis x1 of the variable throttle valve 3 (an axial center line of the shock absorber D) substantially perpendicularly. By rotating the motor 40, the acting portion 41 of the actuator 4 can be caused to approach and retreat from the central axis x1 of the variable throttle member 3.

The power transmission mechanism 5 is constituted by a rotary body 50 that rotates about a rotary shaft 50a upon reception of the linear motion of the acting portion 41 of the actuator 4. The rotary body 50 is formed in an L shape, and includes an input piece 50b and an output piece 50c. The rotary shaft 50a is provided in a part of the rotary body 50 where the input piece 50b and the output piece 50c intersect. In the input piece 50b, an outside surface positioned on an opposite side (a left side in FIG. 2) to the output piece 50c contacts the acting portion 41 of the actuator 4. In the output piece 50c, an outside surface positioned on an opposite side (a lower side in FIG. 2) to the input piece 50b contacts the push rod 30 of the variable throttle member 3. The rotary shaft 50a is disposed further toward the actuator 4 side than the central axis x1 of the variable throttle member 3.

Figure 2:
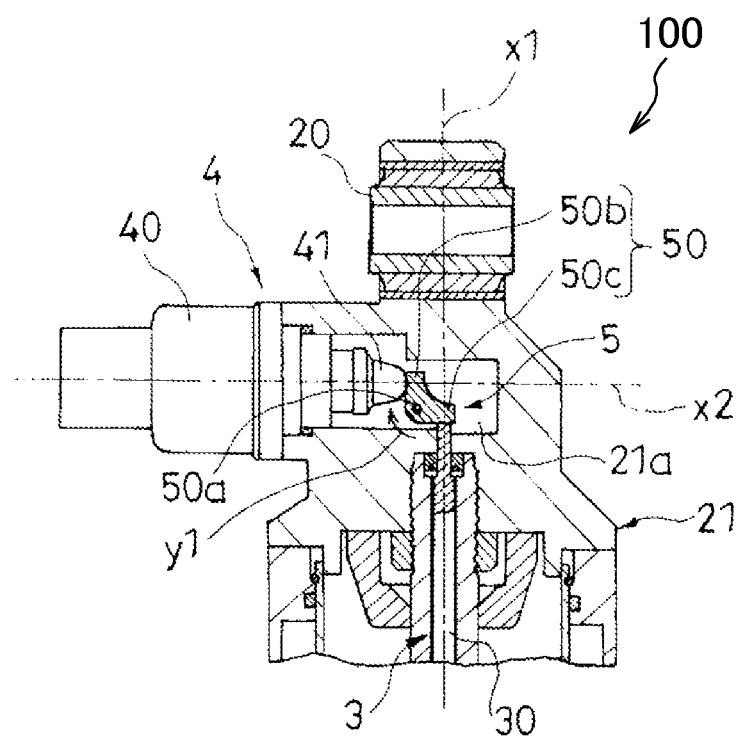
FIG. 2 is a view showing an enlargement of a vehicle body side part of FIG. 1A.

When the motor 40 causes the acting portion 41 to approach the central axis x1 of the variable throttle member 3, the rotary body 50 rotates in a direction of an arrow y1 (clockwise in FIG. 2). Accordingly, the output piece 50c rotates so as to push the variable throttle member 3 downward. Hence, the needle valve 31 of the variable throttle member 3 is caused to advance into the bush 23 so as to narrow the gap flow passage b10, and as a result, the opening of the bypass passage B can be reduced. The flow rate of the working fluid passing through the flow passages L1, L2 in the piston 7 therefore increases such that the damping force generated by the shock absorber D is adjusted in an increasing direction.

When the motor 40 causes the acting portion 41 to retreat from the central axis x1 of the variable throttle member 3, on the other hand, the variable throttle member 3 is pushed upward by a pressure in the contraction side chamber r2 such that the rotary body 50 rotates in an opposite direction to the arrow y1 (counterclockwise in FIG. 2). Hence, the needle valve 31 of the variable throttle member 3 is caused to retreat from the bush 23 so as to widen the gap flow passage b10, and as a result, the opening of the bypass passage B can be increased. The flow rate of the working fluid passing through the flow passages L1, L2 in the piston 7 therefore decreases such that the damping force generated by the shock absorber D is adjusted in a decreasing direction.

Next, actions and effects of the suspension apparatus 100 will be described.

In the suspension apparatus 100, the actuator 4 is connected to the vehicle body side of the suspension spring S via the housing 21. Further, the motor 40 is disposed on the spring of the suspension spring S. In the suspension apparatus 100, therefore, an impact input from the vehicle wheel side can be absorbed by the suspension spring S, with the result that direct input of the impact into the motor 40 can be suppressed.

The actuator 4 includes the acting portion 41 that acts on the variable throttle member 3, and the motion conversion mechanism (not shown) that converts the rotary motion of the motor 40 into the linear motion of the acting portion 41. The actuator 4 is disposed such that the central axis x2 of the acting portion 41 intersects the central axis x1 of the variable throttle valve 3 substantially perpendicularly. The acting portion 41 and the variable throttle valve 3 are provided eccentrically. The suspension apparatus 100 includes the power transmission mechanism 5 interposed between the acting portion 41 and the variable throttle member 3. In the suspension apparatus 100, the power transmission mechanism 5 converts a direction of the linear motion of the acting portion 41 and transmits the linear motion to the variable throttle member 3.

Hence, with the suspension apparatus 100, there is no need to arrange the variable throttle member 3, the actuator 4, and the vehicle body side attachment member 20 longitudinally along the central axis of the shock absorber D, as in the comparative example described above. In the suspension apparatus 100, the actuator 4 can be disposed at a remove from the central axis of the shock absorber D.

According to the suspension apparatus 100, therefore, the vehicle body side attachment member 20 and the variable throttle member 3 can be provided close together even when the actuator 4 is disposed on the vehicle body side and the vehicle body side attachment member 20 and variable throttle member 3 are disposed along the central axis of the shock absorber D. As a result, an attachment dimension of the suspension apparatus 100 can be shortened.

In the suspension apparatus 100, the power transmission mechanism 5 includes the rotary body 50 that rotates about the rotary shaft 50a upon reception of the linear motion of the acting portion 41 of the actuator 4. Therefore, the linear motion of the acting portion 41 can be transmitted to the variable throttle member 3 even when the variable throttle member 3 and the acting portion 41 are provided eccentrically such that the central axis x2 of the acting portion 41 does not overlap the central axis x1 of the variable throttle member 3.

In the power transmission mechanism 5, the rotary body 50 is formed in an L shape including the input piece 50b and the output piece 50c. The acting portion 41 of the actuator 4 contacts the outside surface of the input piece 50b. The outside surface of the output piece 50c contacts the variable throttle member 3. The rotary shaft 50a is provided in the part where the input piece 50b and the output piece 50c intersect. The rotary shaft 50a is disposed further toward the actuator 4 side (the left side in FIG. 2) than the central axis x1 of the variable throttle member 3.

Hence, when the rotary body 50 rotates upon reception of the linear motion of the acting portion 41, the power transmission mechanism 5 converts the direction of the linear motion of the acting portion 41 into a direction of a linear motion of the variable throttle member 3. As a result, an input from the actuator 4 can be transmitted to the variable throttle member 3 easily. Furthermore, the power transmission mechanism 5 is configured simply and can therefore be housed in a small space. Accordingly, the suspension apparatus 100 can be reduced in size.

Moreover, in the rotary body 50, a ratio between a distance (referred to hereafter as a "distance d1") from a point of force at which an input from the actuator 4 is received to a fulcrum (the rotary shaft 50a) and a distance (referred to hereafter as a "distance d2") from a point of application on the push rod 30 of the variable throttle member 3 to the fulcrum (the rotary shaft 50a) can be modified easily.

In the suspension apparatus 600 according to the comparative example, described above, a movement distance of the acting portion 41 and a movement distance of the variable throttle member 3 are equal, but the distance by which the variable throttle member 3 is moved is shorter than a movable distance (referred to hereafter as a "stroke length") of the acting portion 41. Therefore, the stroke length of the acting portion 41 cannot be utilized sufficiently.

In the suspension apparatus 100, on the other hand, the stroke length of the acting portion 41 of the actuator 4 can be used effectively by reducing the distance d2 relative to the distance d1. As a result, the variable throttle member 3 can be driven using a smaller amount of force than in the comparative example.

Further, the variable throttle member 3 includes the needle valve 31 inserted into the bypass passage B to be capable of advancing and retreating, and the push rod 30 interposed between the needle valve 31 and the power transmission mechanism 5. The base end portion 30a of the push rod 30, provided on the opposite side to the needle valve 31, is formed to have a smaller diameter than the remaining part. The variable throttle member 3 is pushed upward to the vehicle body side (the upper side in FIG. 1) by the pressure in the contraction side chamber r2, but by providing the power transmission mechanism 5, a force acting on the motor 40 can be reduced.

According to the embodiment described above, a following effect is obtained.

The attachment dimension of the suspension apparatus 100 can be shortened easily even in a case where the actuator 4 is disposed on the vehicle body side such that the vehicle body side attachment member 20 and the variable throttle member 3 are disposed along the central axis of the shock absorber D, or a case where the actuator 4 is disposed on the vehicle wheel side such that the vehicle wheel side attachment member 10 and the variable throttle member 3 are disposed along the central axis of the shock absorber D.

Second Embodiment

Figure 3:
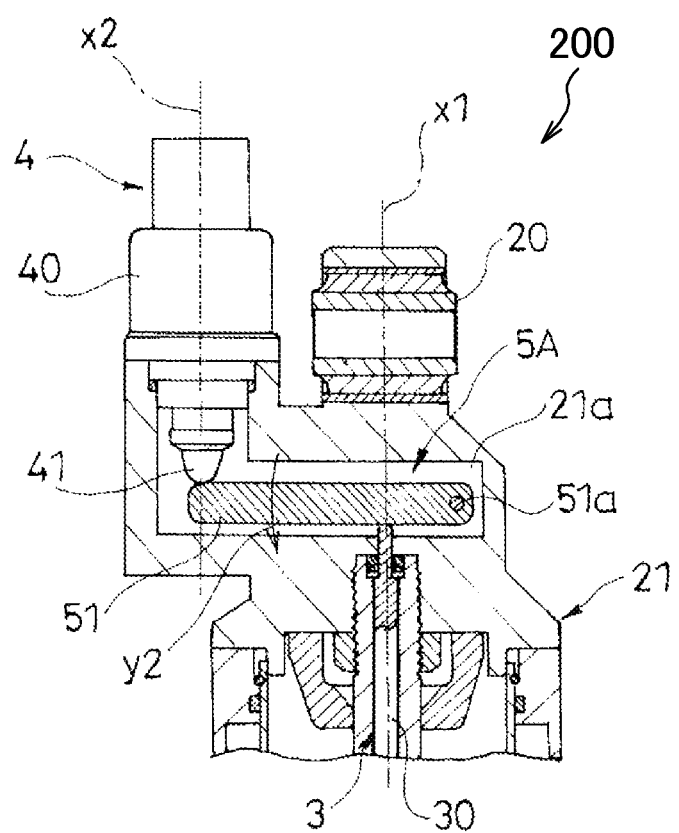
FIG. 3 is a longitudinal sectional view showing an enlargement of a vehicle body side part of a suspension apparatus according to a second embodiment of the present invention.

Referring to FIG. 3, a suspension apparatus 200 according to a second embodiment of the present invention will be described below. In each of the embodiments described below, configurations that are identical to the above embodiment have been allocated identical reference symbols, and duplicate description thereof has been omitted where appropriate.

The suspension apparatus 200 according to the second embodiment differs from the first embodiment in the configuration of the power transmission mechanism and the arrangement of the actuator, but all other configurations, as well as actions and effects thereof, are identical to the first embodiment.

In the suspension apparatus 200, the actuator 4 is disposed such that the central axis x2 of the acting portion 41 is substantially parallel to the central axis x1 of the variable throttle valve 3 (the axial center line of the shock absorber D). In the suspension apparatus 200, the acting portion 41 and the variable throttle member 3 are provided eccentrically. Similarly to the first embodiment, a power transmission mechanism 5A is constituted by a rotary body 51 that rotates about a rotary shaft 51a upon reception of the linear motion of the actuator 4.

The rotary body 51 is constituted by a plate-shaped body disposed so as to intersect both the central axis x2 of the acting portion 41 and the central axis x1 of the variable throttle member 3. The acting portion 41 and the push rod 30 of the variable throttle member 3 respectively contact the rotary body 51. The rotary shaft 51a is provided in a positioned further removed from the actuator 4 than a contact position of the variable throttle member 3. In the suspension apparatus 200, the rotary shaft 51a, the variable throttle member 3, and the actuator 4 are arranged in a lateral direction in that order.

With the configuration described above, when the motor 40 causes the acting portion 41 to move to the vehicle wheel side (a lower side in FIG. 3), the rotary body 51 rotates in a direction of an arrow y2 (counterclockwise in FIG. 3) so as to push the variable throttle member 3 downward. Hence, the needle valve 31 of the variable throttle member 3 is caused to advance into the bush 23 so as to narrow the gap flow passage b10, and as a result, the opening of the bypass passage B can be reduced. The flow rate of the working fluid passing through the flow passages L1, L2 in the piston 7 therefore increases such that the damping force generated by the shock absorber D is adjusted in the increasing direction.

When the motor 40 causes the acting portion 41 to move to the vehicle body side (an upper side in FIG. 3), on the other hand, the variable throttle member 3 is pushed upward by the pressure in the contraction side chamber r2 such that the rotary body 51 rotates in an opposite direction to the arrow y2 (clockwise in FIG. 3). Hence, the needle valve 31 of the variable throttle member 3 is caused to retreat from the bush 23 so as to widen the gap flow passage b10, and as a result, the opening of the bypass passage B can be increased. The flow rate of the working fluid passing through the flow passages L1, L2 in the piston 7 therefore decreases such that the damping force generated by the shock absorber D is adjusted in the decreasing direction.

Next, actions and effects of the suspension apparatus 200 will be described.

In the suspension apparatus 200, the central axis x2 of the acting portion 41 and the central axis x1 of the variable throttle member 3 are disposed to be substantially parallel. Further, the acting portion 41 and the variable throttle member 3 are provided eccentrically. The suspension apparatus 200 includes the power transmission mechanism 5A interposed between the acting portion 41 and the variable throttle member 3. The power transmission mechanism 5A transmits the linear motion of the acting portion 41 to the variable throttle member 3.

Hence, likewise in the suspension apparatus 200, similarly to the first embodiment, there is no need to arrange the variable throttle member 3, the actuator 4, and the vehicle body side attachment member 20 longitudinally along the central axis of the shock absorber D. As a result, the actuator 4 can be disposed at a remove from the central axis of the shock absorber D.

Therefore, the vehicle body side attachment member 20 and the variable throttle member 3 can be provided close together even when the actuator 4 is disposed on the vehicle body side and the vehicle body side attachment member 20 and variable throttle member 3 are disposed along the central axis of the shock absorber D. As a result, the attachment dimension of the suspension apparatus 200 can be shortened easily.

Further, the power transmission mechanism 5A includes the rotary body 51 that rotates about the rotary shaft 51a upon reception of the linear motion of the acting portion 41 of the actuator 4. Similarly to the first embodiment, therefore, the linear motion of the acting portion 41 can be transmitted easily to the variable throttle member 3 even when the variable throttle member 3 and the acting portion 41 are provided eccentrically such that the central axis x2 of the acting portion 41 and the central axis x1 of the variable throttle member 3 do not overlap.

In the power transmission mechanism 5A, the rotary body 51 is constituted by the plate-shaped body disposed so as to intersect both the central axis x2 of the acting portion 41 and the central axis x1 of the variable throttle member 3. The acting portion 41 contacts a surface (an upper surface in FIG. 3) on an opposite side to the cylinder 1. The variable throttle member 3 contacts a surface (a lower surface in FIG. 3) on the cylinder 1 side. The rotary shaft 51a is provided in a position (on a right side in FIG. 3) further removed from the actuator 4 than the variable throttle member 3.

Hence, even when the central axis x2 of the acting portion 41 and the central axis x1 of the variable throttle member 3 are removed from each other, the linear motion of the acting portion 41 can be transmitted easily to the variable throttle member 3 by having the rotary body 51 rotate upon reception of the linear motion of the acting portion 41. Furthermore, the power transmission mechanism 5A is configured simply and can therefore be housed in a small space, enabling a reduction in the size of the suspension apparatus 200.

Moreover, in the rotary body 51, a ratio between a distance (referred to hereafter as a "distance d3") from a point of force at which an input from the actuator 4 is received to a fulcrum (the rotary shaft 51a) and a distance (referred to hereafter as a "distance d4") from a point of application on the push rod 30 of the variable throttle member 3 to the fulcrum (the rotary shaft 51a) can be modified easily.

In the suspension apparatus 600 according to the comparative example, described above, the stroke length of the acting portion 41 in the actuator 4 cannot be utilized sufficiently. In the suspension apparatus 200, however, the distance d4 is shorter than the distance d3, and therefore the stroke length of the acting portion 41 of the actuator 4 can be used effectively. As a result, the variable throttle member 3 can be driven using a smaller amount of force than in the comparative example.

Third Embodiment

Figure 4:
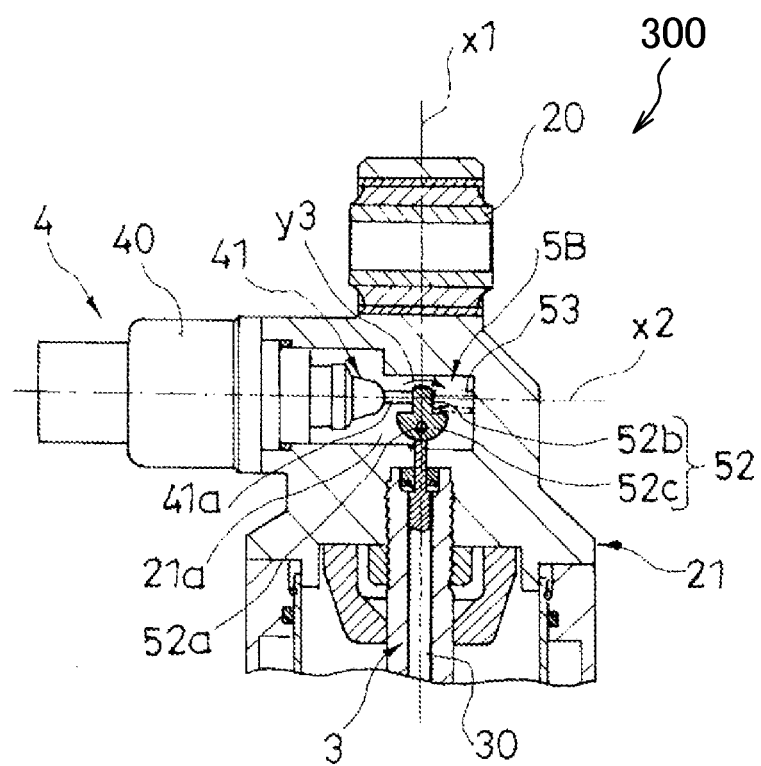
FIG. 4 is a longitudinal sectional view showing an enlargement of a vehicle body side part of a suspension apparatus according to a third embodiment of the present invention.

Referring to FIG. 4, a suspension apparatus 300 according to a third embodiment of the present invention will be described below.

The suspension apparatus 300 according to the third embodiment differs from the first embodiment in the configuration of the power transmission mechanism and a shape of the acting portion of the actuator, but all other configurations, as well as actions and effects thereof, are identical to the first embodiment.

In the suspension apparatus 300, the acting portion 41 of the actuator 4 includes an extension piece 41a that extends along the central axis x2 of the acting portion 41 toward the central axis x1 of the variable throttle member 3. A power transmission mechanism 5B includes a rotary body 52 that rotates about a rotary shaft 52a upon reception of the linear motion of the acting portion 41 of the actuator 4, and a biasing spring 53 that biases the rotary body 52 in a direction for causing the rotary body 52 to rotate on the actuator side.

The rotary body 52 includes an output portion 52c formed with a curved surface on one side so as to have a fan-shaped cross-section, and an input portion 52b that stands upright from an opposite side to the curved surface of the output portion 52c. The extension piece 41a of the acting portion 41 contacts a side face of the input portion 52b. The curved surface of the output portion 52c contacts the push rod 30 of the variable throttle member 3.

The rotary shaft 52a is provided on the curved surface side of the output portion 52c. The rotary shaft 52a is disposed on the central axis x1 of the variable throttle member 3. The biasing spring 53 contacts a side face of the input portion 52b on an opposite side to the actuator 4.

In the suspension apparatus 300, when the variable throttle member 3 retreats by a maximum extent such that the opening of the bypass passage B is at a maximum, the push rod 30 is set to contact a position of the curved surface that is closest to the rotary shaft 52a.

With the configuration described above, when the motor 40 causes the acting portion 41 to approach the central axis x1 of the variable throttle member 3, the rotary body 52 rotates in a direction of an arrow y3 (clockwise in FIG. 4) such that the position in which the rotary body 52 is contacted by the push rod 30 moves away from the rotary shaft 52a. As a result, the variable throttle member 3 is pushed downward. Hence, the needle valve 31 of the variable throttle member 3 is caused to advance into the bush 23 so as to narrow the gap flow passage b10, and as a result, the opening of the bypass passage B can be reduced. The flow rate of the working fluid passing through the flow passages L1, L2 formed in the piston 7 therefore increases, with the result that the damping force generated by the shock absorber D is adjusted in the increasing direction.

When the motor 40 causes the acting portion 41 to move away from the central axis x1 of the variable throttle member 3, on the other hand, the rotary body 52 is caused to rotate in an opposite direction to the arrow y3 (counterclockwise in FIG. 4) by a biasing force of the biasing spring 53 such that the position in which the rotary body 52 is contacted by the push rod 30 approaches the rotary shaft 52a. As a result, the variable throttle member 3 is pushed upward by the pressure in the contraction side chamber r2. Hence, the needle valve 31 of the variable throttle member 3 is caused to retreat from the bush 23 so as to widen the gap flow passage b10, and as a result, the opening of the bypass passage B can be increased. The flow rate of the working fluid passing through the flow passages L1, L2 formed in the piston 7 therefore decreases, with the result that the damping force generated by the shock absorber D is adjusted in the decreasing direction.

Next, actions and effects of the suspension apparatus 300 will be described.

In the suspension apparatus 300, similarly to the first embodiment, the actuator 4 is disposed such that the central axis x2 of the acting portion 41 intersects the central axis x1 of the variable throttle valve 3 substantially perpendicularly. Further, the acting portion 41 and the variable throttle valve 3 are provided eccentrically. The suspension apparatus 300 includes the power transmission mechanism 5B interposed between the acting portion 41 and the variable throttle member 3. The power transmission mechanism 5B converts the direction of the linear motion of the acting portion 41 and transmits the linear motion to the variable throttle member 3.

Hence, likewise with the suspension apparatus 300, similarly to the first embodiment, there is no need to arrange the variable throttle member 3, the actuator 4, and the vehicle body side attachment member 20 longitudinally along the central axis of the shock absorber D. As a result, the actuator 4 can be disposed at a remove from the central axis of the shock absorber D.

Therefore, the vehicle body side attachment member 20 and the variable throttle member 3 can be provided close together even when the actuator 4 is disposed on the vehicle body side and the vehicle body side attachment member 20 and variable throttle member 3 are disposed along the central axis of the shock absorber D. As a result, the attachment dimension of the suspension apparatus 300 can be shortened easily.

Further, in the suspension apparatus 300, the power transmission mechanism 5B includes the rotary body 52 that rotates about the rotary shaft 52a upon reception of the linear motion of the acting portion 41 of the actuator 4. Similarly to the first embodiment, therefore, the linear motion of the acting portion 41 can be transmitted easily to the variable throttle member 3 even when the variable throttle member 3 and the acting portion 41 are provided eccentrically such that the central axis x2 of the acting portion 41 and the central axis x1 of the variable throttle member 3 do not overlap.

Moreover, the power transmission mechanism 5B includes the rotary body 52 and the biasing spring 53 that biases the rotary body 52 in the direction for causing the rotary body 52 to rotate on the actuator 4 side. The rotary body 52 includes the output portion 52c formed with a curved surface on one side so as to have a fan-shaped cross-section, and the input portion 52b that stands upright from the opposite side to the curved surface of the output portion 52c. The acting portion 41 contacts the side face of the input portion 52b. The variable throttle member 3 contacts the curved surface of the output portion 52c. The rotary shaft 52a is provided on the curved surface side of the output portion 52c and disposed on the central axis x1 of the variable throttle member 3. The biasing spring 53 contacts the side face of the input portion 52b on the opposite side to the actuator 4.

Hence, by having the rotary body 52 rotate upon reception of the linear motion of the acting portion 41, the power transmission mechanism 5B can easily convert the direction of the linear motion of the acting portion 41 into the direction of the linear motion of the variable throttle member 3 and transmit the linear motion easily to the variable throttle member 3. Furthermore, the power transmission mechanism 5B is configured simply and can therefore be housed in a small space, enabling a reduction in the size of the suspension apparatus 300.

Moreover, a distance (referred to hereafter as a "distance d6") by which the variable throttle member 3 is moved by the rotation of the rotary body 52 can easily be made shorter than a distance (referred to hereafter as a "distance d5") by which the acting portion 41 moves in order to rotate the rotary body 52.

In the suspension apparatus 600 according to the comparative example, described above, the stroke length of the acting portion 41 in the actuator 4 cannot be utilized sufficiently. In the suspension apparatus 300, however, the distance d4 is shorter than the distance d5, and therefore the stroke length of the acting portion 41 of the actuator 4 can be used effectively. As a result, the variable throttle member 3 can be driven using a smaller amount of force than in the comparative example.

Fourth Embodiment

Figure 5:
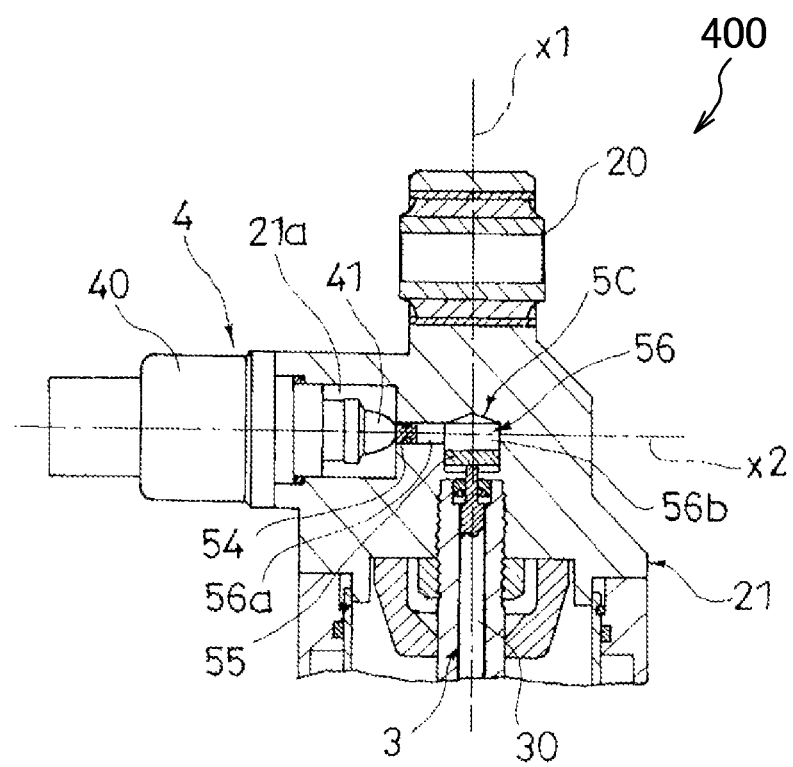
FIG. 5 is a longitudinal sectional view showing an enlargement of a vehicle body side part of a suspension apparatus according to a fourth embodiment of the present invention.

Referring to FIG. 5, a suspension apparatus 400 according to a fourth embodiment of the present invention will be described below.

The suspension apparatus 400 according to the fourth embodiment differs from the first embodiment in the configuration of the power transmission mechanism, but all other configurations, as well as actions and effects thereof, are identical to the first embodiment.

In the suspension apparatus 400, a power transmission mechanism 5C includes a first movable wall 54 capable of moving in an identical direction to the acting portion 41 as the acting portion 41 moves, a second movable wall 55 capable of moving in an identical direction to the variable throttle member 3 as the variable throttle member 3 moves, and a fluid retention chamber 56 formed between the first movable wall 54 and the second movable wall 55.

The fluid retention chamber 56 includes a first chamber 56a into which the first movable wall 54 is inserted to be capable of advancing and retreating, and a second chamber 56b which communicates with the first chamber 56a and into which the second movable wall 55 is inserted to be capable of advancing and retreating. A fluid constituted by a liquid or a gas is charged into an interior of the fluid retention chamber 56. An identical fluid or a different fluid to the working fluid housed in the cylinder 1 may be used as the fluid.

With the configuration described above, when the motor 40 causes the acting portion 41 to approach the central axis x1 of the variable throttle member 3, the first movable wall 54 moves in an identical direction. Accordingly, the fluid in the first chamber 56a moves into the second chamber 56b such that the second movable wall 55 and the variable throttle member 3 are pushed downward in the axial direction (a downward direction in FIG. 5). Hence, the needle valve 31 of the variable throttle member 3 is caused to advance into the bush 23 so as to narrow the gap flow passage b10, and as a result, the opening of the bypass passage B can be reduced. The flow rate of the working fluid passing through the flow passages L1, L2 in the piston 7 therefore increases such that the damping force generated by the shock absorber D is adjusted in the increasing direction.

When the motor 40 causes the acting portion 41 to move away from the central axis x1 of the variable throttle member 3, on the other hand, the variable throttle member 3 and the second movable wall 55 are pushed upward in the axial direction (an upward direction in FIG. 5) by the pressure in the contraction side chamber r2. As a result, the fluid in the second chamber 56b moves into the first chamber 56a such that the first movable wall 54 moves to the actuator 4 side (a left side in FIG. 5). Hence, the needle valve 31 of the variable throttle member 3 is caused to retreat from the bush 23 so as to widen the gap flow passage b10, and as a result, the opening of the bypass passage B can be increased. The flow rate of the working fluid passing through the flow passages L1, L2 in the piston 7 therefore decreases such that the damping force generated by the shock absorber D is adjusted in the decreasing direction.

Next, actions and effects of the suspension apparatus 400 will be described.

In the suspension apparatus 400, similarly to the first embodiment, the actuator 4 is disposed such that the central axis x2 of the acting portion 41 intersects the central axis x1 of the variable throttle valve 3 substantially perpendicularly. Further, the acting portion 41 and the variable throttle valve 3 are provided eccentrically. The suspension apparatus 400 includes the power transmission mechanism 5C interposed between the acting portion 41 and the variable throttle member 3. The power transmission mechanism 5C converts the direction of the linear motion of the acting portion 41 and transmits the linear motion to the variable throttle member 3.

Hence, likewise with the suspension apparatus 400, similarly to the first embodiment, there is no need to arrange the variable throttle member 3, the actuator 4, and the vehicle body side attachment member 20 longitudinally along the central axis of the shock absorber D. As a result, the actuator 4 can be disposed at a remove from the central axis of the shock absorber D.

Therefore, the vehicle body side attachment member 20 and the variable throttle member 3 can be provided close together even when the actuator 4 is disposed on the vehicle body side and the vehicle body side attachment member 20 and variable throttle member 3 are disposed along the central axis of the shock absorber. As a result, the attachment dimension of the suspension apparatus 400 can be shortened easily.

Further, the power transmission mechanism 5C includes the first movable wall 54 that is capable of moving in an identical direction to the acting portion 41 as the acting portion 41 moves, the second movable wall 55 that is capable of moving in an identical direction to the variable throttle member 3 as the variable throttle member 3 moves, and the fluid retention chamber 56 formed between the first movable wall 54 and the second movable wall 55. The fluid retention chamber 56 includes the first chamber 56a into which the first movable wall 54 is inserted to be capable of advancing and retreating, and the second chamber 56b which communicates with the first chamber 56a and into which the second movable wall 55 is inserted to be capable of advancing and retreating. A fluid is charged into the interior of the fluid retention chamber 56.

Hence, by having the first movable wall 54 and the second movable wall 55 move upon reception of the linear motion of the acting portion 41, the power transmission mechanism 5C can easily convert the direction of the linear motion of the acting portion 41 into the direction of the linear motion of the variable throttle member 3 and transmit the linear motion easily to the variable throttle member 3. Furthermore, the power transmission mechanism 5C is configured simply and can therefore be housed in a small space, enabling a reduction in the size of the suspension apparatus 400.

Moreover, in the suspension apparatus 400, the second movable wall 55 is formed to have a larger outer diameter than the first movable wall 54. Further, the second chamber 56b is formed to have a larger sectional area than the first chamber 56a. Therefore, a distance (referred to hereafter as a "distance d8") by which the variable throttle member 3 moves together with the second movable wall 55 can easily be made shorter than a distance (referred to hereafter as a "distance d7") by which the first movable wall 54 moves together with the acting portion 41.

In the suspension apparatus 600 according to the comparative example, described above, the stroke length of the acting portion 41 in the actuator 4 cannot be utilized sufficiently. In the suspension apparatus 400, however, the distance d8 is shorter than the distance d7, and therefore the stroke length of the acting portion 41 of the actuator 4 can be used effectively. As a result, the variable throttle member 3 can be driven using a smaller amount of force than in the comparative example.

Fifth Embodiment

Figure 6:
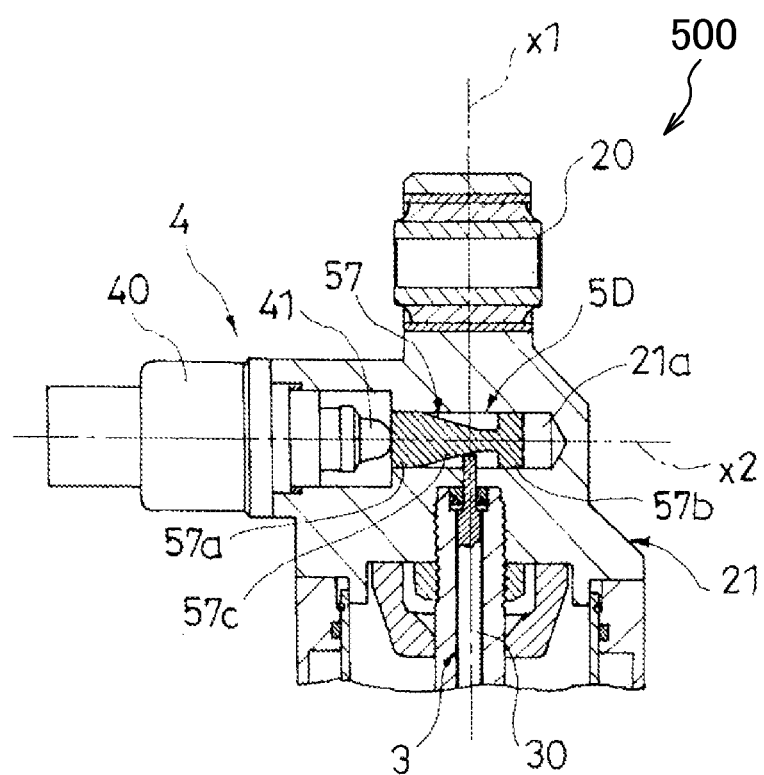
FIG. 6 is a longitudinal sectional view showing an enlargement of a vehicle body side part of a suspension apparatus according to a fifth embodiment of the present invention.

Referring to FIG. 6, a suspension apparatus 500 according to a fifth embodiment of the present invention will be described below.

The suspension apparatus 500 according to the fifth embodiment differs from the first embodiment in the configuration of the power transmission mechanism, but all other configurations, as well as actions and effects thereof, are identical to the first embodiment.

In the suspension apparatus 500, a power transmission mechanism 5D is constituted by a columnar body 57 that is connected to the acting portion 41 to be capable of moving while intersecting the central axis x1 of the variable throttle member 3. The columnar body 57 includes a pair of bearing portions 57a, 57b disposed on respective ends thereof so as to slide against the inner peripheral surface of the housing 21, and a conical portion 57c that is disposed between the bearing portions 57a, 57b and decreases gradually in diameter from the actuator 4 side toward the opposite side to the actuator 4. The push rod 30 of the variable throttle member 3 contacts an outer peripheral surface of the conical portion 57c.

With the configuration described above, when the motor 40 causes the acting portion 41 to approach the central axis x1 of the variable throttle member 3, the columnar body 57 moves in an identical direction. As a result, the conical portion 57c contacted by the push rod 30 increases in diameter such that the variable throttle member 3 is pushed downward in the axial direction (a downward direction in FIG. 6). Hence, the needle valve 31 of the variable throttle member 3 is caused to advance into the bush 23 so as to narrow the gap flow passage b10, and as a result, the opening of the bypass passage B can be reduced. The flow rate of the working fluid passing through the flow passages L1, L2 in the piston 7 therefore increases such that the damping force generated by the shock absorber D is adjusted in the increasing direction.

When, on the other hand, the motor 40 causes the acting portion 41 to move away from the central axis x1 of the variable throttle member 3, the columnar body 57 moves in an identical direction. As a result, the conical portion 57c contacted by the push rod 30 decreases in diameter such that the variable throttle member 3 is pushed upward in the axial direction (an upward direction in FIG. 6) by the pressure in the contraction side chamber r2. Hence, the needle valve 31 of the variable throttle member 3 is caused to retreat from the bush 23 so as to widen the gap flow passage b10, and as a result, the opening of the bypass passage B can be increased. The flow rate of the working fluid passing through the flow passages L1, L2 in the piston 7 therefore decreases such that the damping force generated by the shock absorber D is adjusted in the decreasing direction.

Next, actions and effects of the suspension apparatus 500 will be described.

In the suspension apparatus 500, similarly to the first embodiment, the actuator 4 is disposed such that the central axis x2 of the acting portion 41 intersects the central axis x1 of the variable throttle valve 3 substantially perpendicularly. Further, the acting portion 41 and the variable throttle valve 3 are provided eccentrically. The suspension apparatus 500 includes the power transmission mechanism 5D interposed between the acting portion 41 and the variable throttle member 3. The power transmission mechanism 5D converts the direction of the linear motion of the acting portion 41 and transmits the linear motion to the variable throttle member 3.

Hence, likewise with the suspension apparatus 500, similarly to the first embodiment, there is no need to arrange the variable throttle member 3, the actuator 4, and the vehicle body side attachment member 20 longitudinally along the central axis of the shock absorber D. As a result, the actuator 4 can be disposed at a remove from the central axis of the shock absorber D.

Therefore, the vehicle body side attachment member 20 and the variable throttle member 3 can be provided close together even when the actuator 4 is disposed on the vehicle body side and the vehicle body side attachment member 20 and variable throttle member 3 are disposed along the central axis of the shock absorber D. As a result, the attachment dimension of the suspension apparatus 500 can be shortened easily.

Further, the power transmission mechanism 5D is constituted by the columnar body 57 connected to the acting portion 41 to be capable of moving while intersecting the central axis x1 of the variable throttle member 3. The columnar body 57 includes the conical portion 57c that decreases gradually in diameter from the actuator 4 side toward the opposite side to the actuator 4. The variable throttle member 3 contacts the outer peripheral surface of the conical portion 57c.

Hence, by having the columnar body 57 move upon reception of the linear motion of the acting portion 41, the power transmission mechanism 5D can easily convert the direction of the linear motion of the acting portion 41 into the direction of the linear motion of the variable throttle member 3 and transmit the linear motion easily to the variable throttle member 3.

Furthermore, the power transmission mechanism 5D is configured simply and can therefore be housed in a small space, enabling a reduction in the size of the suspension apparatus 500.

Further, a distance (referred to hereafter as a "distance d10") by which the variable throttle member 3 is moved by the movement of the columnar body 57 can easily be made shorter than a distance (referred to hereafter as a "distance d9") by which the acting portion 41 moves in order to move the columnar body 57.

In the suspension apparatus 600 according to the comparative example, described above, the stroke length of the acting portion 41 in the actuator 4 cannot be utilized sufficiently. In the suspension apparatus 500, however, the distance d10 is shorter than the distance d9, and therefore the stroke length of the acting portion 41 of the actuator 4 can be used effectively. As a result, the variable throttle member 3 can be driven using a smaller amount of force than in the comparative example.

Embodiments of the present invention were described above, but the above embodiments are merely examples of applications of the present invention, and the technical scope of the present invention is not limited to the specific constitutions of the above embodiments.

For example, in the above embodiments, the suspension apparatus 100, 200, 300, 400, 500 is a rear cushion unit, but may be a front fork that suspends a front wheel of a motorcycle or a suspension apparatus for a transportation device other than a motorcycle, such as an automobile.

Further, in the above embodiments, the shock absorber D is an upright type shock absorber in which the piston rod 2 is connected to the vehicle body side via the vehicle body side attachment member 20 and the cylinder 1 is connected to the vehicle wheel side via the vehicle wheel side attachment member 10. The present invention is not limited thereto, however, and the shock absorber D may be an inverted type shock absorber in which the piston 1 is connected to the vehicle body side via a vehicle body side attachment member and the piston rod 2 is attached to the vehicle wheel side via a vehicle wheel side attachment member. Likewise in this case, there is no need to arrange the variable throttle member 3, the actuator 4, and the vehicle wheel side attachment member along the central axis of the shock absorber D.

Hence, the attachment dimension of the suspension apparatus can be shortened easily even when the actuator 4 is disposed on the vehicle wheel side and the vehicle wheel side attachment member and variable throttle member 3 are disposed along the central axis of the shock absorber D.

Furthermore, in the above embodiments, the shock absorber D is a single tube type shock absorber having the free piston 6 that is capable of moving through the cylinder 1 in the axial direction and the air chamber A that is defined by the free piston 6 to be capable of swelling and contracting. Therefore, volume compensation and temperature compensation can be performed by the air chamber A. The present invention is not limited thereto, however, and the shock absorber D may be a multiple tube type shock absorber having an outer tube disposed on an outer periphery of the cylinder 1, a reservoir formed between the outer tube and the cylinder 1 in order to house a working fluid, a base member fixed to the cylinder 1 in order to separate the reservoir from the contraction side chamber r2, another flow passage formed in the base member to connect the reservoir to the contraction side chamber, and another damping force generation mechanism that applies resistance to the working fluid passing through the other flow passage. In this case, volume compensation and temperature compensation are performed by the reservoir.

Furthermore, in this case, a bypass passage may be provided to connect the reservoir to the contraction side chamber r2 so as to bypass the other flow passage formed in the base member (not shown), and the damping force generated by the shock absorber may be adjusted by modifying an opening of the bypass passage using the variable throttle member 3.

Moreover, the configuration of the power transmission mechanism 5, 5A, 5B, 5C, 5D is not limited to those described above, and any configuration may be selected appropriately as long as the linear motion of the acting portion 41 disposed eccentrically relative to the variable throttle member 3 can be transmitted to the variable throttle member 3.

Further, in the first, second, and third embodiments, an auxiliary spring (not shown) may be added to the power transmission mechanism 5, 5A, 5B to bias the rotary body 50, 51, 52 in a direction for causing the rotary body 50, 51, 52 to rotate on the opposite side to the actuator (the side of the arrow y1, y2, y3). In this case, advancement of the variable throttle member 3 into the bypass passage 3 is assisted by the auxiliary spring, and therefore a load exerted on the motor 40 can be lightened.

This application claims priority based on Japanese Patent Application No. 2012-116376 filed with the Japan Patent Office on May 22, 2012, the entire contents of which are incorporated into this specification.

The embodiments of the present invention in which an exclusive property or privilege is claimed are defined as follows:

1. A suspension apparatus interposed between a vehicle body and a vehicle wheel, comprising:
   a shock absorber having a cylinder and a piston rod inserted retractably into the cylinder; and
   a biasing member that biases the shock absorber in an expansion direction,
   wherein the shock absorber includes:
   a pair of chambers housing a working fluid;
   a flow passage that connects the pair of chambers such that the working fluid passes through the flow passage as the shock absorber expands and contracts;
   a damping force generation mechanism that is configured to apply resistance to the working fluid passing through the flow passage;
   a bypass passage that connects the pair of chambers so as to bypass the flow passage;
   a variable throttle member that is inserted into the bypass passage to be capable of advancing and retreating in a first linear direction in order to modify an opening of the bypass passage;
   an actuator that is configured to drive the variable throttle member, and includes a motor, an acting portion disposed on a back surface side of the variable throttle member and provided eccentrically relative to the variable throttle member, and a motion conversion mechanism that is configured to convert a rotary motion of the motor into a linear motion of the acting portion so that the acting portion is movable in a second linear direction, the second linear direction being a different direction than the first linear direction; and
   a power transmission mechanism interposed between the acting portion and the variable throttle member in order to transmit the linear motion of the acting portion to the variable throttle member so that the variable throttle member moves in the first linear direction.

2. The suspension apparatus as defined in claim 1, wherein the power transmission mechanism includes a rotary body that is configured to rotate about a rotary shaft upon reception of the linear motion of the acting portion so as to transmit the linear motion of the acting portion to move the variable throttle member in the first linear direction.

3. The suspension apparatus as defined in claim 2, wherein the rotary body is formed in an L shape having an input piece and an output piece,
   an outside surface of the input piece contacts the acting portion,
   an outside surface of the output piece contacts the variable throttle member, and
   the rotary shaft is provided in a part where the input piece and the output piece intersect, and disposed further toward the actuator side than a central axis of the variable throttle member.

4. The suspension apparatus as defined in claim 2, wherein the rotary body is constituted by a plate-shaped body disposed so as to intersect both a central axis of the acting portion and a central axis of the variable throttle member,
   the acting portion contacts a surface of the rotary body on an opposite side to the cylinder,
   the variable throttle member contacts a surface of the rotary body on the cylinder side, and
   the rotary shaft is provided in a position further removed from the actuator than the variable throttle member.

5. The suspension apparatus as defined in claim 2, wherein the power transmission mechanism includes:
   the rotary body; and
   a biasing spring that is configured to bias the rotary body in a direction for causing the rotary body to rotate on the actuator side,
   the rotary body includes:
   an output portion formed in a fan shape having a curved surface on one side; and
   an input portion that stands upright from an opposite side of the output portion to the curved surface,
   the acting portion contacts a side face of the input portion,
   the variable throttle member contacts the curved surface of the output portion,
   the rotary shaft is provided on the curved surface side of the output portion and disposed on a central axis of the variable throttle member, and
   the biasing spring contacts a side face of the input portion on an opposite side to the actuator.

6. The suspension apparatus as defined in claim 1, wherein the power transmission mechanism includes:
   a first movable wall capable of moving in an identical direction to the acting portion as the acting portion moves;
   a second movable wall capable of moving in an identical direction to the variable throttle member as the variable throttle member moves; and
   a fluid retention chamber formed between the first movable wall and the second movable wall, and
   the fluid retention chamber includes a first chamber into which the first movable wall is inserted to be capable of advancing and retreating and a second chamber which communicates with the first chamber and into which the second movable wall is inserted to be capable of advancing and retreating, and a fluid is charged into an interior thereof.

7. The suspension apparatus as defined in claim 6, wherein an outer diameter of the second movable wall is formed to be larger than an outer diameter of the first movable wall.

8. The suspension apparatus as defined in claim 1, wherein the power transmission mechanism includes a conical portion that is constituted by a columnar body that is connected to the acting portion to be capable of moving while intersecting a central axis of the variable throttle member, and decreases gradually in diameter from the actuator side to an opposite side to the actuator, and
   the variable throttle member contacts an outer peripheral surface of the conical portion.

9. The suspension apparatus as defined in claim 1, wherein the variable throttle member includes:
   a needle valve inserted into the bypass passage to be capable of advancing and retreating; and
   a push rod interposed between the needle valve and the power transmission mechanism, and
   a base end portion of the push rod on an opposite side to the needle valve is formed to have a smaller diameter than a remaining part.

10. The suspension apparatus as defined in claim 1, wherein the first linear direction and the second linear direction are substantially perpendicular to each other.

* * * * *